(12) United States Patent
Panitz

(10) Patent No.: US 12,503,079 B2
(45) Date of Patent: Dec. 23, 2025

(54) ANGLED PLUG CONNECTION, ELECTRICAL CONNECTOR FOR SUCH AN ANGLED PLUG CONNECTION AND ELECTRICALLY HEATED WINDSHIELD WIPER WITH SUCH AN ANGLED PLUG CONNECTION

(71) Applicant: TE Connectivity Germany GmbH, Bensheim (DE)

(72) Inventor: Gregor Panitz, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 665 days.

(21) Appl. No.: 17/183,983

(22) Filed: Feb. 24, 2021

(65) Prior Publication Data

US 2021/0265778 A1 Aug. 26, 2021

(30) Foreign Application Priority Data

Feb. 24, 2020 (DE) .................... 10 2020 202 352.2

(51) Int. Cl.
  *B60S 1/34* (2006.01)
  *B60S 1/38* (2006.01)
  (Continued)

(52) U.S. Cl.
  CPC ................ *B60S 1/345* (2013.01); *B60S 1/38* (2013.01); *B60S 1/40* (2013.01); *H01R 13/629* (2013.01);
  (Continued)

(58) Field of Classification Search
  CPC ........ B60S 1/3805; B60S 1/3849; B60S 1/40; B60S 1/34; B60S 1/3425; B60S 1/3445; B60S 1/345; B60S 1/32; B60S 1/38; H01R 13/62905; H01R 13/04; H01R 13/112; H01R 13/62; H01R 13/629; H01R 13/631; H01R 13/639; H01R 13/6271; H01R 13/6272; H01R 13/6273; H01R 2201/26
  (Continued)

(56) References Cited

U.S. PATENT DOCUMENTS 3,408,678 A * 11/1968 Linker .................. B60S 1/3805
  219/203
6,908,345 B2 6/2005 Shimizu et al.
  (Continued)

FOREIGN PATENT DOCUMENTS

DE 60124733 T2 9/2007
EP 2803540 A1 11/2014
  (Continued)

OTHER PUBLICATIONS

Extended European search report dated Jul. 5, 2021, in Appln. No. 21159019.5-1201, 13 pp.
(Continued)

*Primary Examiner* — C. A. Rivera
(74) *Attorney, Agent, or Firm* — Barley Snyder

(57) ABSTRACT

An angled plug connection includes a connector adapted to be plugged along a first plug-in direction and a mating connector adapted to be plugged along a second plug-in direction extending at an angle or perpendicularly to the first plug-in direction. The connector is connected to the mating connector by a link guide.

14 Claims, 9 Drawing Sheets

(51) Int. Cl.
    *B60S 1/40*         (2006.01)
    *H01R 13/04*       (2006.01)
    *H01R 13/11*       (2006.01)
    *H01R 13/627*     (2006.01)
    *H01R 13/629*     (2006.01)

(52) U.S. Cl.
    CPC ............ *H01R 13/04* (2013.01); *H01R 13/112* (2013.01); *H01R 13/6272* (2013.01); *H01R 13/6273* (2013.01); *H01R 2201/26* (2013.01)

(58) Field of Classification Search
    USPC ............. 15/250.32, 250.06, 250.05; 439/682
    See application file for complete search history.

(56)             References Cited

U.S. PATENT DOCUMENTS

| | | |
|---|---|---|
| 8,381,348 B2 | 2/2013 | Egner-Walter et al. |
| 9,455,523 B1 | 9/2016 | Sundarakrishnamachari et al. |
| 9,598,053 B2 | 3/2017 | Caillot et al. |
| 11,273,795 B2 * | 3/2022 | Egner-Walter .......... B60S 1/381 |
| 2013/0183838 A1 | 7/2013 | Caillot et al. |
| 2013/0298348 A1 | 11/2013 | Caillot et al. |

FOREIGN PATENT DOCUMENTS

| | | |
|---|---|---|
| JP | 6-163107 A | 6/1994 |
| JP | 2012503566 A | 2/2012 |

OTHER PUBLICATIONS

Korean Office Action dated Jun. 5, 2025 with English translation, corresponding to Application No. 10-2021-0023428, 12 pages.

* cited by examiner

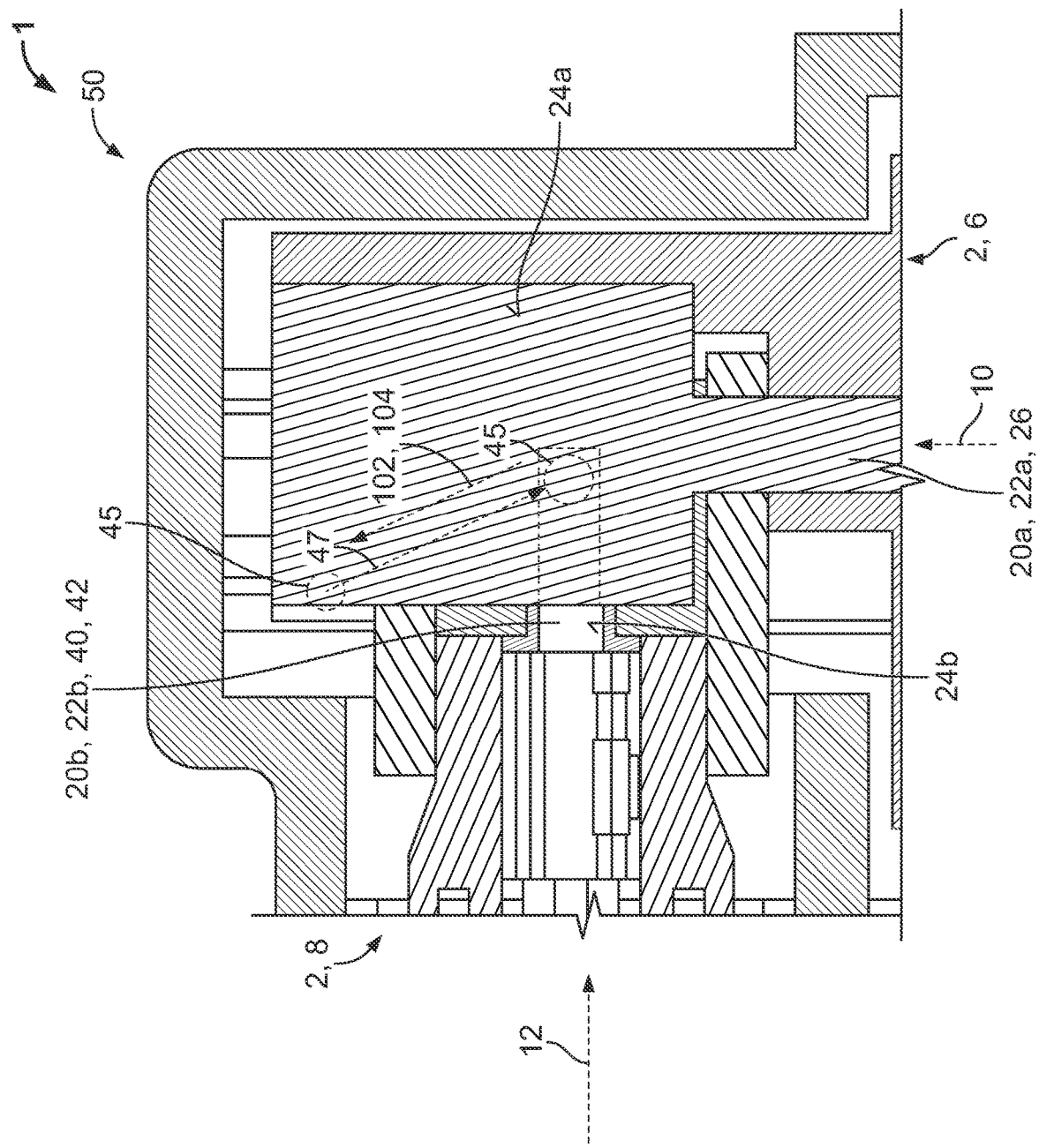

ANGLED PLUG CONNECTION, ELECTRICAL CONNECTOR FOR SUCH AN ANGLED PLUG CONNECTION AND ELECTRICALLY HEATED WINDSHIELD WIPER WITH SUCH AN ANGLED PLUG CONNECTION

CROSS-REFERENCE TO RELATED APPLICATION

This application claims the benefit of the filing date under 35 U.S.C. § 119(a)-(d) of German Patent Application No. 102020202352.2, filed on Feb. 24, 2020.

FIELD OF THE INVENTION

The present invention relates to a plug connection and, more particularly, to an angled plug connection.

BACKGROUND

In modern technology, releasable plug connections are required in a plurality of applications for data transmission or for the transmission of electrical currents and/or liquid media, for example, also in automotive engineering for windshield wiper systems. Cleaning liquids that are distributed by wiper blades are used as liquid media and then enhance the cleaning effect of the windshield wiper system. In order to ensure the operation of the windshield wiper system even with frost and icy wind, electric heating elements are installed in the wiper blades which prevent the cleaning fluid from freezing by supplying electrical energy. Furthermore, the heating elements can easily remove snow and ice from the windshield if necessary.

In the development of such plug connections, the requirements of the system providers to always provide more compact, lighter, and cheaper end products represent a challenge. Challenging requirements frequently arise with regard to the installation space, plugging direction, and accessibility of the individual components of the plug connection. In addition, there may be strict requirements that demand the plug connection to be handled easily and quickly.

SUMMARY

An angled plug connection includes a connector adapted to be plugged along a first plug-in direction and a mating connector adapted to be plugged along a second plug-in direction extending at an angle or perpendicularly to the first plug-in direction. The connector is connected to the mating connector by a link guide.

BRIEF DESCRIPTION OF THE DRAWINGS

The invention will now be described by way of example with reference to the accompanying Figures, of which:

FIG. 10 is a detail sectional view of a shift in a point of contact in the angled plug connection.

DETAILED DESCRIPTION OF THE EMBODIMENT(S)

Figure 1:
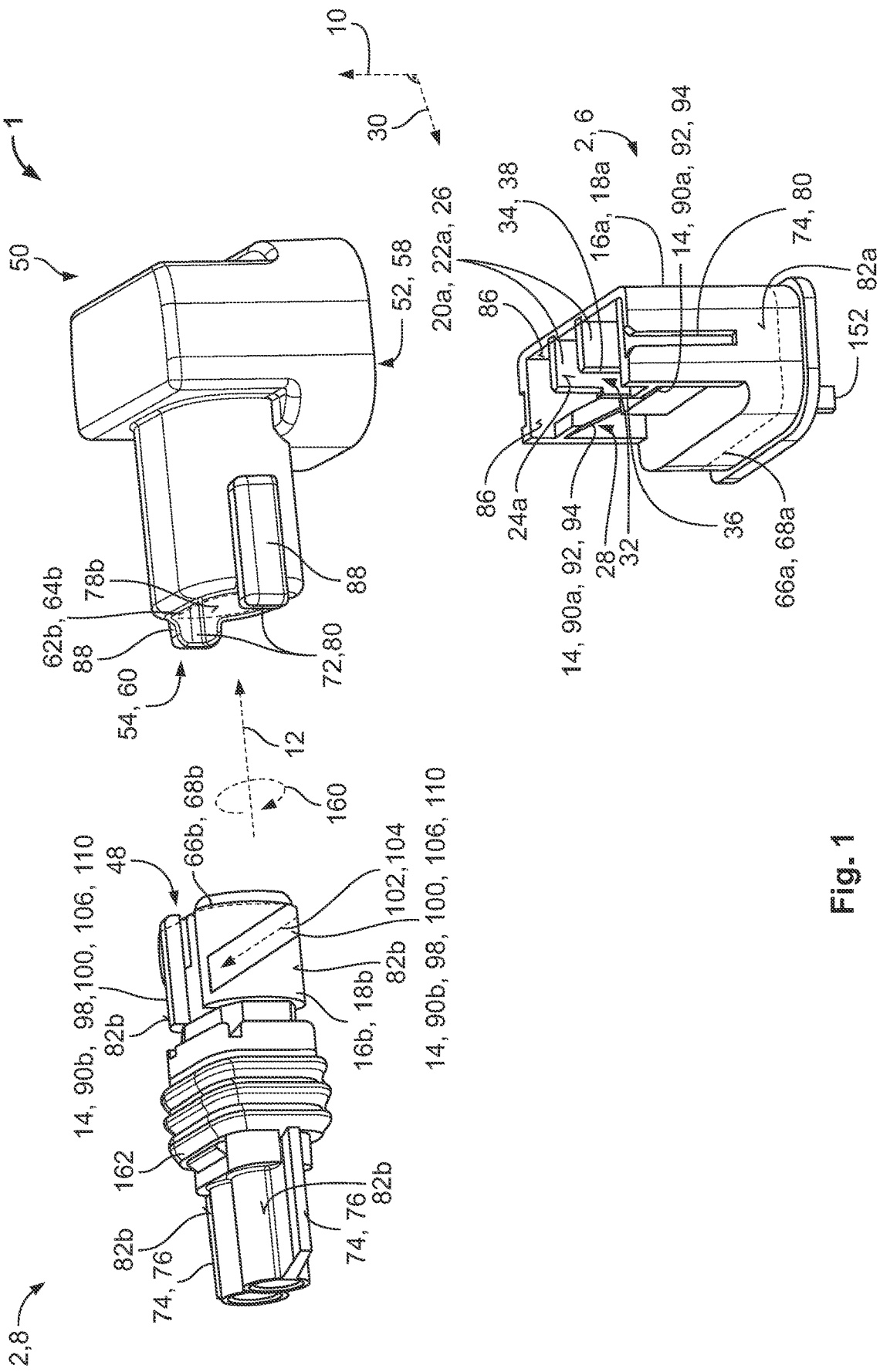
FIG. 1 is an exploded perspective view of an angled plug connection according to an embodiment.

Features and exemplary embodiments as well as advantages of the present disclosure will be explained in detail with respect to the drawings. It is understood that the present disclosure should not be construed as being limited by the description of the following embodiments. It should furthermore be understood that some or all of the features described in the following may also be combined in alternative ways.

The schematic structure of an angled plug connection 1 according to the invention and an electrical connector 2 according to the invention shall first be illustrated with reference to FIGS. 1 to 8 and FIG. 10. The schematic structure of an electrically heated windshield wiper 4 according to the invention shall then be described with reference to FIG. 9.

Angled plug connection 1 according to the invention can comprise a connector 6 and a mating connector 8, wherein connector 6 is adapted to be plugged into angled plug connection 1 along a first plug-in direction 10 and mating connector 8 is adapted to be plugged into angled plug connector 1 along a second plug-in direction 12 extending at an angle or perpendicular to first plug-in direction 10. Furthermore, connector 6 can be connected to mating connector 8 by way of a link guide 14, as shall be explained farther below with reference to FIGS. 4 and 5.

Electrical connector 2 according to the invention described in more detail below can be used in different embodiments as connector 6 and/or mating connector 8. To make the text easier to understand, only the distinction between connector 6 and mating connector 8 shall be described below, while the description also respectively relates to electrical connector 2 according to the invention.

As shown in FIG. 1, connector 6 has a connector housing 16a. Accordingly, mating connector 8 has a connector housing 16b. Connector housings 16a, 16b can be, for example, injection molded parts made of plastic material. Furthermore, connector housings 16a, 16b can serve as contact supports 18a, 18b. Contact support 18a, 18b can each hold at least one electrically conductive contact element 20a, 20b for establishing contact with a complementary mating contact 22b, 22a. For this purpose, respective contact elements 20a, 20b can comprise a contact surface 24a, 24b and be cast or plugged into the corresponding contact support 18a, 18b. For the purpose of accessibility to respective contact surfaces 24a, 24b, corresponding contact element 20a, 20b can be cast into contact support 18a only in part and/or protrude into a recess in contact support 18b.

In the embodiment shown in FIG. 1, connector housing 16a of connector 6 configured as a contact support 18a holds at least one blade-shaped contact 26, for example, two blade-shaped contacts 26. Blade-shaped contacts 26 extend parallel to one another along first plug-in direction 10 into a space 28 which is in part surrounded by connector housing 16a of connector 6. For this purpose, blade-shaped contacts 26 are in part cast into contact support 18a and remain accessible in sections laterally, in particular from a direction 30 perpendicular to first plug-in direction 10. Accessible sections 32 of blade-shaped contacts 26 are each formed having at least one insertion chamfer 34, wherein at least one insertion chamfer 34 extends on an edge 36 of respective blade-shaped contact 26 that is parallel to first plug-in direction 10. The at least one insertion chamfer 34 creates a deeper material thickness than in the remaining blade-shaped contact 26. This means, in the region of insertion chamfer 34, blade-shaped contact 26 has a smaller material thickness perpendicular to first plug-in direction 10. More precisely, two respective points on the outer surface of blade-shaped contact 26, which are disposed opposite each other with respect to first plug-in direction 10, exhibit a smaller distance in the region of insertion chamfer 34 than outside the region of insertion chamfer 34. Two insertion chamfers 34, in an embodiment, can be formed on respective blade-shaped contacts 26 which together form an insertion blade 38.

Figure 2:
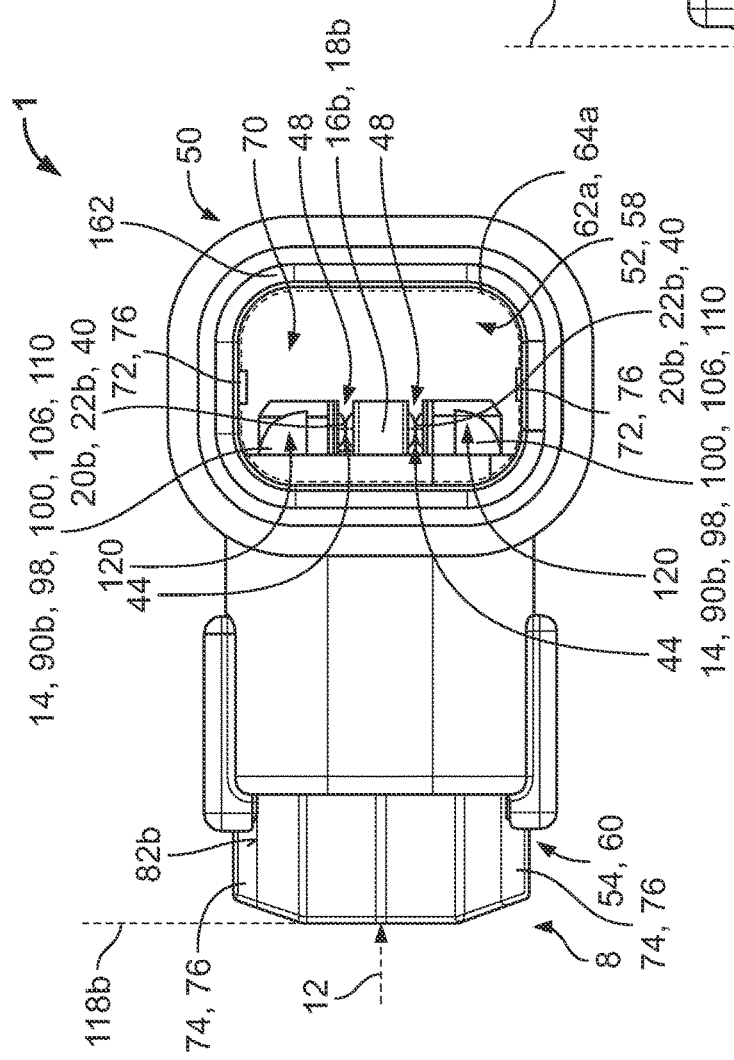
FIG. 2 is a bottom view of the angled plug connection with a mating connector in a pre-assembly position.
Figure 7:
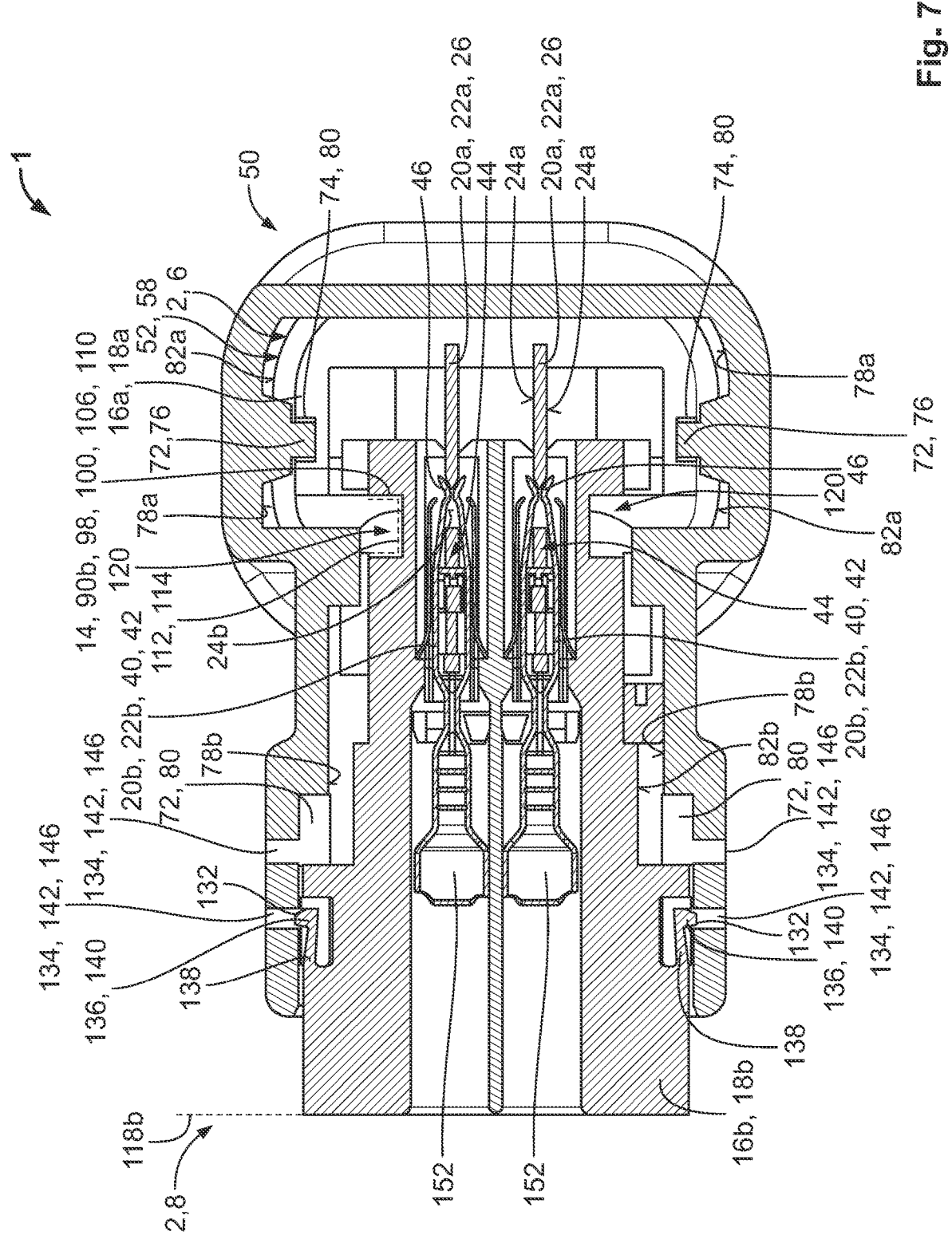
FIG. 7 is a sectional top view of the angled plug connection of FIG. 6 in a pre-assembly position.

In the embodiment shown, connector housing 16b of mating connector 8 configured as contact support 18b holds at least one fork-shaped contact 40, for example, two fork-shaped contacts 40, as shown in FIGS. 2 and 7. Fork-shaped contacts 40 can each comprise at least two contact strips 42 which define a contact slot 44. Contact slot 44 extends parallel to second plug-in direction 12. In particular, contact strips 42 can be arranged in pairs mirror-symmetrically with respect to contact slot 44. Two tips 45 of contact strips 42 disposed opposite to one another with respect to contact slot 44 are, in an embodiment, pressed against one another in a resilient manner. Furthermore, fork-shaped contacts 40 each protrude into gap-shaped openings 48 of contact support 18b so that the corresponding contact slot 44 is accessible on both sides perpendicular to second plug-in direction 12. The first plug-in direction 10 and the second plug-in direction 12 can be represented by two linearly independent two-dimensional vectors. The first plug-in direction 10 and the second plug-in direction 12 can extend in particular at an angle of 90°+/−45° relative to one another.

The arrangement of the blade-shaped 26 and fork-shaped contacts 40 can also be interchanged depending on the application. The number of blade-shaped 26 and fork-shaped contacts 40 can be adapted to the number of terminals required for the application. In the case of a high number of terminals, a plugging aid, for example, in the form of a lever, can be provided in order to be able to provide the plugging forces that increase proportionally with the number of terminals.

Angled plug connection 1 can furthermore comprise a guide housing 50, shown in FIG. 1, which is formed having a first receptacle 52 for connector 6 and a second receptacle 54 for mating connector 8, wherein second receptacle 54 opens into first receptacle 52. The course of first receptacle 52 and of second receptacle 54 is shown by way of example in FIG. 4. First receptacle 52 extends linearly along first plug-in direction 10. Second receptacle 54 accordingly extends linearly along second plug-in direction 12. Guide housing 50 can also be a plastic injection-molded part and be formed, for example, as a cage 56 in which connector 6 or mating connector 8 is captively arranged to be movable.

Figure 5:
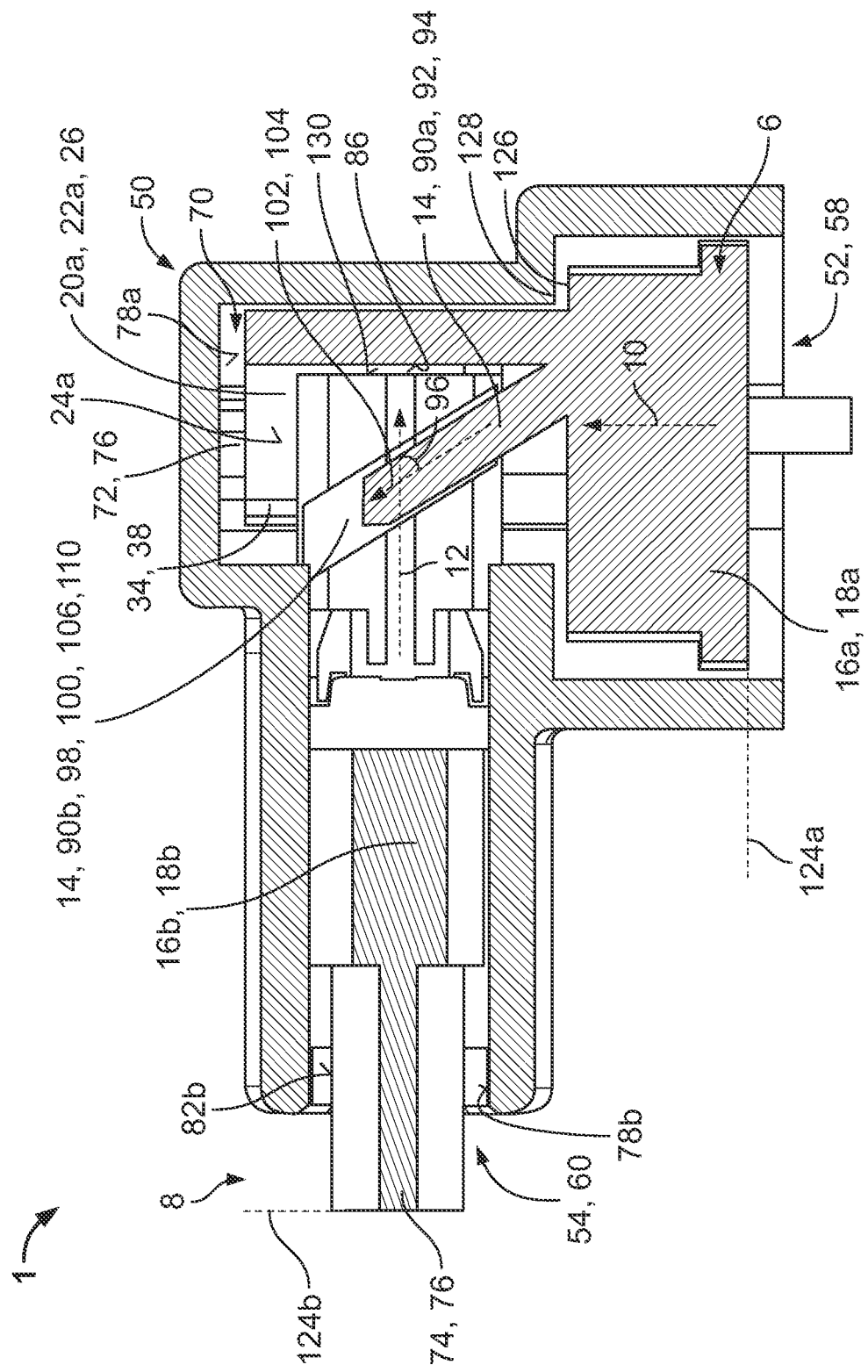
FIG. 5 is a sectional side view of the angled plug connection in the final assembly position.

First receptacle 52 can form a first socket 58 which in at least one cross section 62a perpendicular to first plug-in direction 10 has an inner contour 64a that corresponds to an outer contour 66a of connector 6 in a cross section 68a of connector 6 that is perpendicular to first plug-in direction 10, as shown in FIGS. 1 and 2. Analogously, second receptacle 54 can form a second socket 60 which in a cross section 62b perpendicular to second plug-in direction 12 has an inner contour 64b which in turn corresponds to an outer contour 66b of mating connector 8 in a cross section 68b of mating connector 8 that is perpendicular to second plug-in direction 12. As shown in FIG. 5, connector 6 and mating connector 8 can be inserted into respective receptacles 52, 54 configured as sockets 58, 60 and plugged together in an interior 70 of guide housing 50.

Figure 4:
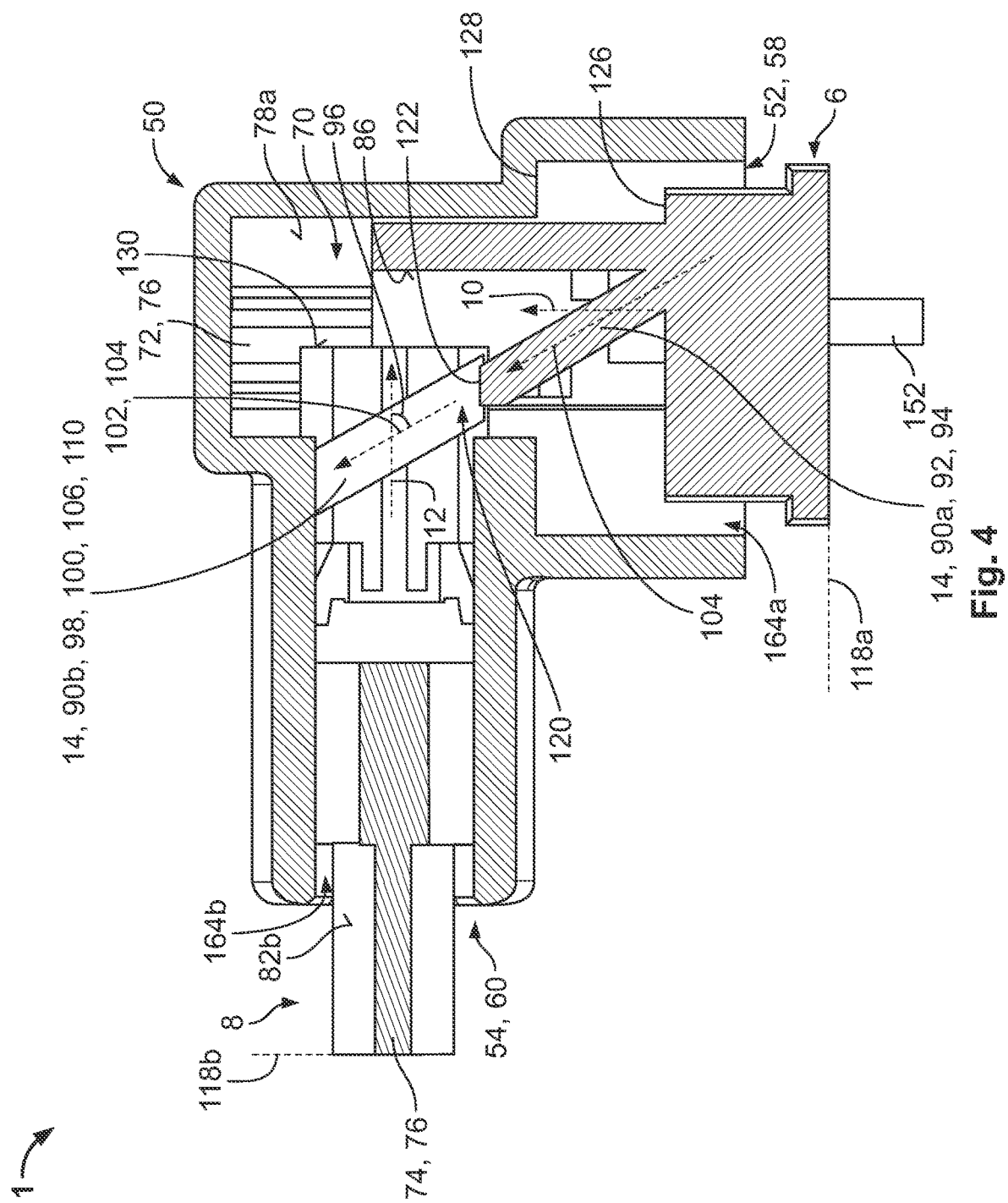
FIG. 4 is a sectional side view of the angled plug connection in the pre-assembly position.

At least one respective linear guide element 72 for linear guidance of a complementary linear guide element 74 of connector 6 or of mating connector 8, respectively, can optionally be formed in first receptacle 52 and/or in second receptacle 54, as shown in FIGS. 2, 4, and 5.

As shown in FIG. 7 for connector 6, the at least one linear guide element 72 in first receptacle 52 can be implemented by a rail-like convexity 76 on at least one inner surface 78a, and in an embodiment on two oppositely disposed inner surfaces 78a of first receptacle 52. In particular, the at least one linear guide element 72 can protrude into first receptacle 52. The associated complementary linear guide element 74 of connector 6 can be a channel-like concavity 80, which is formed on at least one outer surface 82a, and in an embodiment on two oppositely disposed outer surfaces 82a of connector housing 16a of connector 6, and at least in part surrounds the corresponding rail-like convexity 76. In other embodiments, the at least one linear guide element 72 can be configured as a bolt-like or a stud-like convexity.

As shown in FIG. 1 for mating connector 8, rail-like convexity 76 can also be formed on at least one outer surface 82b, and in an embodiment on two oppositely disposed outer surfaces 82b of connector housing 16b of mating connector 8. Accordingly, channel-like concavity 80 is formed on at least one inner surface 78b, and in an embodiment on two oppositely disposed inner surfaces 78b of second receptacle 54. In the embodiment shown in FIG. 1, two channel-like concavities 80 are each sunk into a bulge 88 of guide housing 50.

For link guide 14 shown in FIGS. 4 and 5, connector 6 can comprise at least one link guide element 90a and mating connector 8 can comprise at least one link guide element 90b that is complementary to link guide element 90a of connector 6. In particular, respective associated link guide elements 90a, 90b can engage in one another, so that link guide 14 directly connects connector 6 to mating connector 8.

The at least one link guide element 90a of connector 6 can be configured, for example, as a sliding block 92. In an embodiment, there are two sliding blocks 92 disposed on connector 6. According to the embodiment shown in FIG. 1, the two sliding blocks 92 can be rail-like projections 94 parallel to each other which extend linearly in space 28 on oppositely disposed inner surfaces 86 of connector housing 16a of connector 6 and extend at least at an acute angle 96 to first plug-in direction 10 and/or to second plug-in direction 12. Alternatively, the two sliding blocks 92 can be configured as bolt-like or stud-like projections.

The at least one link guide element 90b of mating connector 8 can again be a connecting link 98 with a link track 100, as shown in FIG. 4, wherein link track 100 is shaped to be complementary to sliding block 92 and the course 102 of link track 100 determines the direction 104 of link guide 14. In an embodiment, two connecting links 98 each with a link guide 100 are disposed on mating connector 8. As shown in FIG. 1, link tracks 100 can be implemented by parallel slot-like recesses 106 on two oppositely disposed outer surfaces 82b of connector housing 16b of mating connector 8. In particular, link tracks 100 can be linear grooves 110 which also extend at an acute angle 96.

Figure 8:
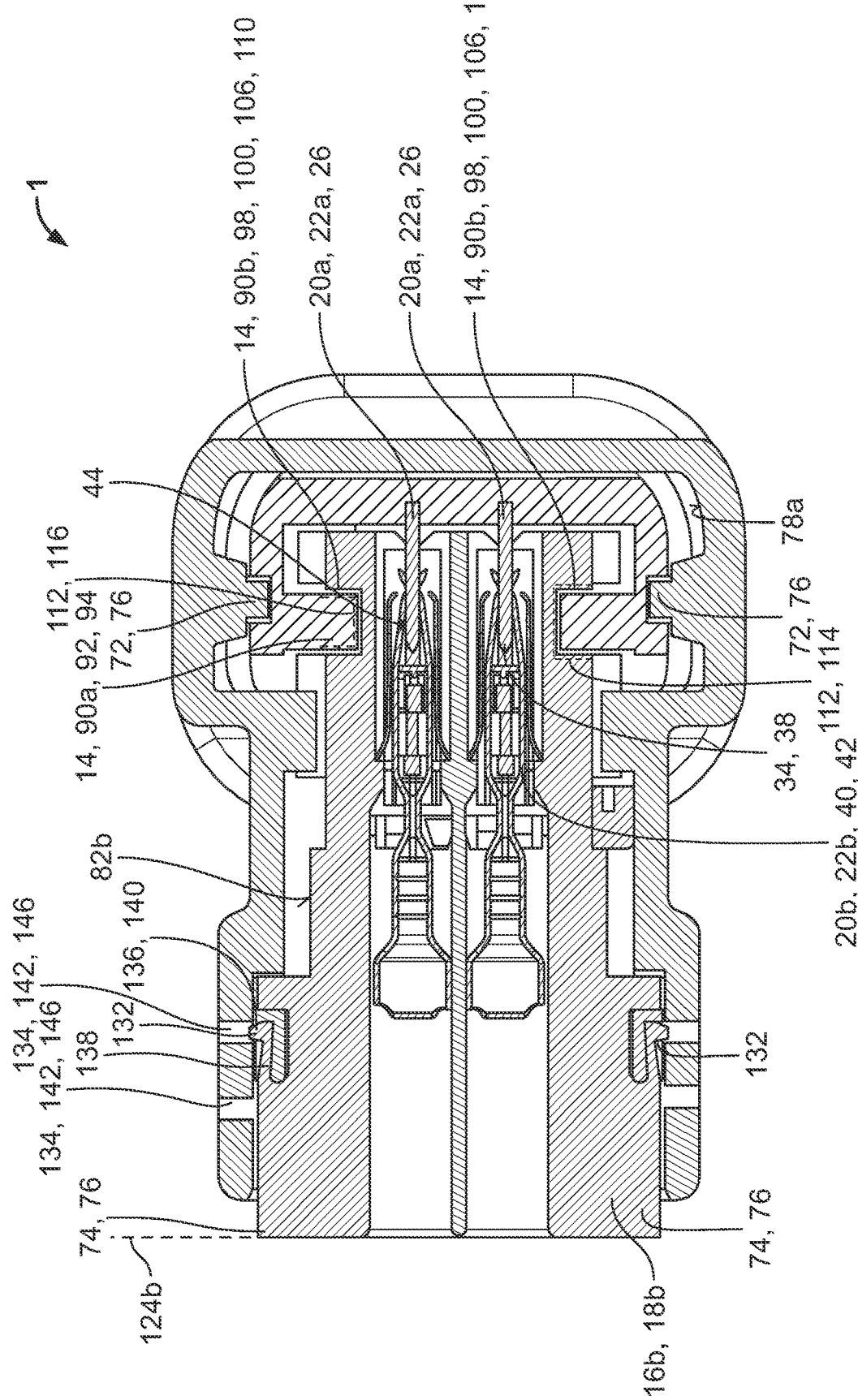
FIG. 8 is a sectional top view of the angled plug connection of FIG. 6 in a final assembly position.

In at least one cross-section 112 perpendicular to course 102 of link track 100, an inner contour 114 of link track 100 corresponds to an outer contour 116 of associated sliding block 92. In the embodiment shown, link tracks 100 each have a rectangularly shaped inner contour 114, as shown in FIGS. 7 and 8. Accordingly, sliding blocks 92 each have a rectangularly shaped outer contour 116. Alternatively, the shape of inner contours 114 and outer contours 116 can be square, triangular, semicircular, oval or a combination of such basic geometric shapes.

As shown in FIG. 2, for example, mating connector 8 can be inserted into second receptacle 54 and made to assume a pre-assembly position 118b. In the embodiment shown, pre-assembly position 118b of mating connector 8 is characterized in that mating connector 8 is inserted into second receptacle 54 until a respective end 120 of link tracks 100 protrudes at least in part into first receptacle 52. This state is also shown in FIGS. 4 and 7.

In FIG. 4, connector 6 is inserted into first receptacle 52 and likewise made to assume a pre-assembly position 118a. In pre-assembly position 118a of connector 6, connector 6 is inserted into first receptacle 52 until a respective outer edge 122 of sliding blocks 92 protrudes into associated link track 100, so that sliding blocks 92 engage with associated link tracks 100. Due to the engagement of associated link guide elements 90a, 90b, a motion of connector 6 along first plug-in direction 10 is coupled by way of link guide 14 with a motion of mating connector 8 in the direction of second plug-in direction 12.

From pre-assembly position 118a of connector 6, connector 6 can be made to assume final assembly position 124a of connector 6 shown in FIG. 5 in that connector 6 is inserted farther into first receptacle 52 along first plug-in direction 10. Final assembly position 124a of connector 6 shown can be characterized in that at least one shoulder 126 of connector housing 16a of connector 6 abuts against a step 128 of first receptacle 52. Alternatively, in final assembly position 124a of connector 6, entire link guide element 90a of the connector can be inserted in link guide element 90b of mating connector 8.

Figure 3:
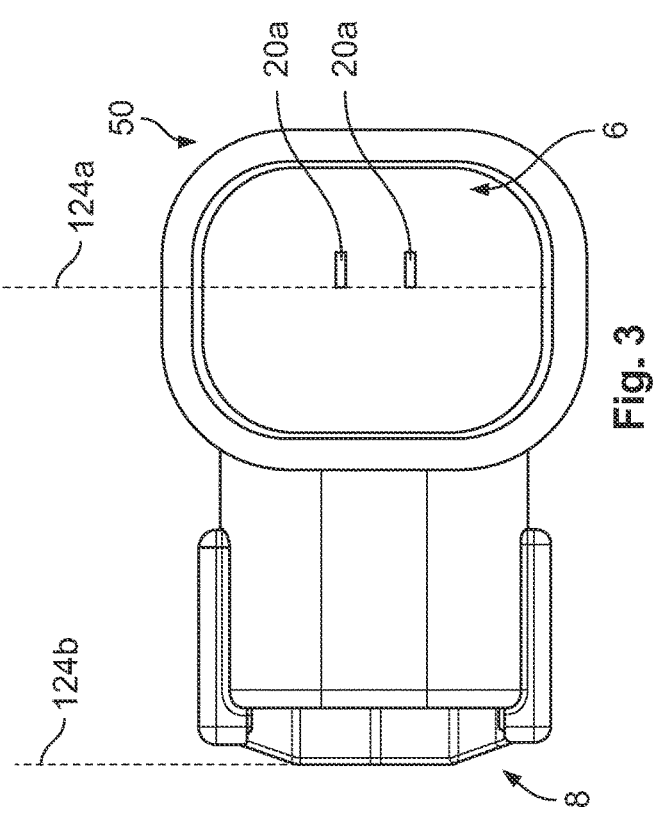
FIG. 3 is a bottom view of the angled plug connection with the mating connector in a final assembly position.

By way of link guide 14, the insertion motion of connector 6 creates a drawing motion of mating connector 8 which moves mating connector 8 farther into second receptacle 54 without then needing to influence mating connector 8 in any other way. The drawing motion can make mating connector 8 assume a final assembly position 124b of mating connector 8. In final assembly position 124b of mating connector 8, a face surface 130 of connector housing 16b of mating connector 8 can rest on an inner surface 86 of connector housing 16a of connector 6. FIG. 3 shows final assembly positions 124a, 124b of connector 6 and mating connector 8.

In the context of an unplugging process, the steps just described take place in reverse order.

Figure 6:
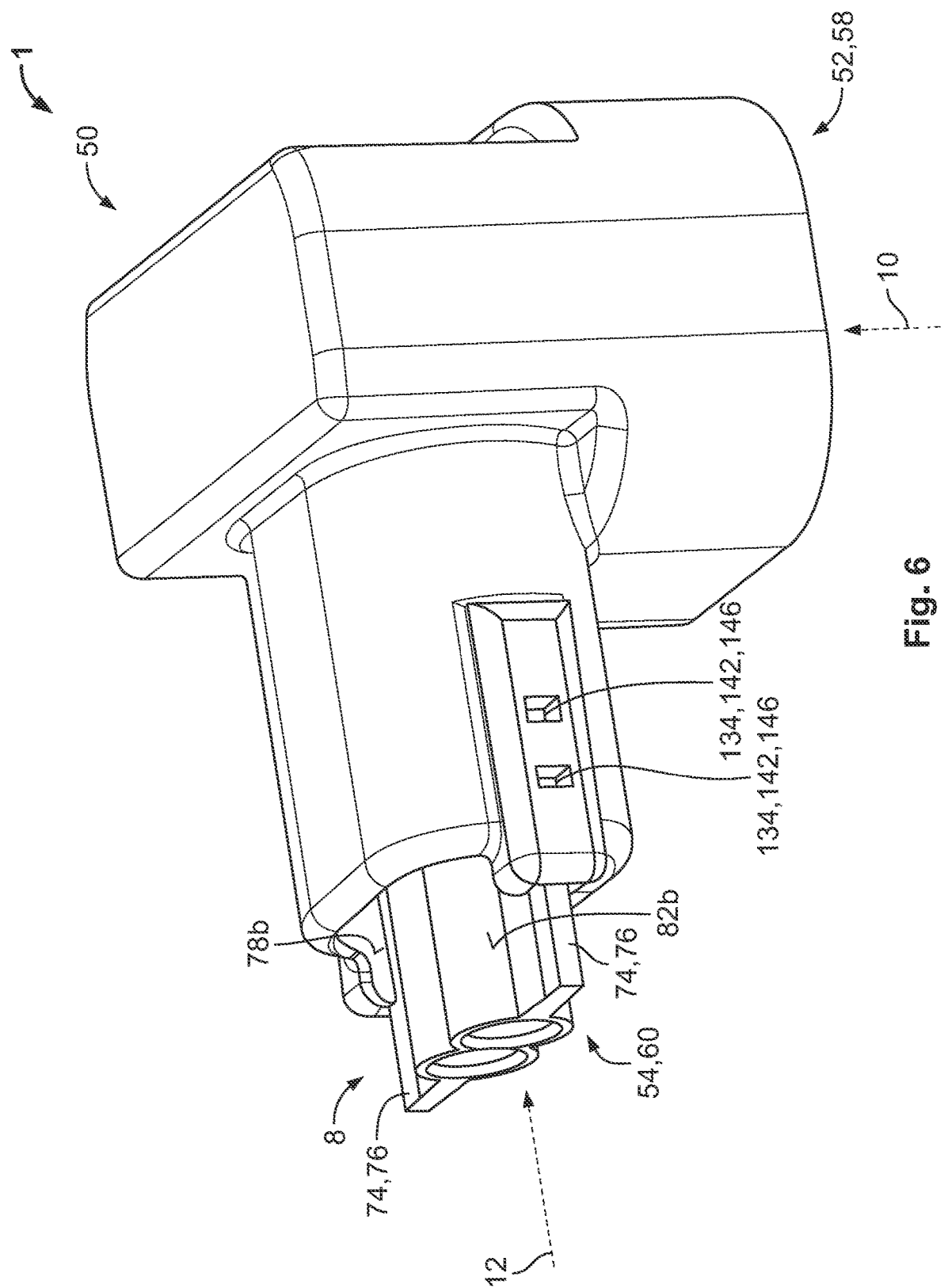
FIG. 6 is a perspective view an angled plug connection according to another embodiment.

FIGS. 6 to 8 show a second possible embodiment of angled plug connection 1 in which pre-assembly position 118b and final assembly position 124b of mating connector 8 are defined by way of a latching connection 132. Latching connection 132 is established by at least one latching element 134 on mating connector 8 and at least one complementary latching element 136 in guide housing 50. In particular, connector housing 16b of mating connector 8 can comprise at least one resilient spring arm 138 with a latching hook 140. At least one corresponding latching groove 142 in which the at least one latching hook 140 can engage can be provided in guide housing 50.

In the embodiment shown in FIGS. 7 and 8, two resilient spring arms 138, each with a latching hook 140, are disposed on connector housing 16b of mating connector 8. Formed in guide housing 50 on two oppositely disposed inner surfaces 78b of second receptacle 54 are latching grooves 142 which are arranged consecutively along second plug-in direction 12. Latching hooks 140 can each engage in one latching groove 142 of guide housing 50 which represents either the pre-assembly position 118b of mating connector 8, the final assembly position 124b of mating connector 8, or both. In an embodiment, two latching grooves 142 can be provided for the connector 6 in the first receptacle 52 which are arranged successively to each other along the first plug-in direction 10. Two latching grooves 142, which are arranged successively to each other along the second plug-in direction 12, can accordingly be provided for the mating connector 8 in the second receptacle 54.

Latching in the pre-latched position (i.e., in the pre-assembly position 118b) and/or in the final latching position (i.e., in the final assembly position 124b) can optionally be verified by an audible click sound and/or a visual inspection. As can additionally be seen from FIGS. 6 to 8, latching grooves 142 of guide housing 50 can be implemented as end-to-end openings 146 so that the engagement of the latching hook 140 is visible from the outside. Although not shown in the figures, such latching elements 134 can optionally also be present on connector 6 and in first receptacle 52.

As illustrated in FIGS. 7 and 8, at least one contact slot 44 of fork-shaped contacts 40 of mating connector 8 can be associated with each blade-shaped contact 26 of connector 6. Furthermore, each blade-shaped contact 26 can be received in associated contact slot 44 in a movable manner relative to associated contact slot 44 in direction 104 along link guide 14 while being in contact with associated contact slot 44. In particular, each blade-shaped contact 26 can be inserted into associated contact slot 44 with the aid of link guide 14 and electrically contacted on both sides. In this process, insertion blade 38 simplifies the insertion of the respective blade-shaped contact 26 into associated contact slot 44, since insertion blade 38 penetrates between tips 46 of contact strips 42 in a wedge-like manner and spreads contact strips 42 apart. In the state of contact strips 42 being spread apart, contact surfaces 24a of blade-shaped contacts 26 touch contact surfaces 24b of fork-shaped contacts 40. In other words, tips 46 of contact strips 42 rest on contact surfaces 24a and contact them electrically at at least one respective point of contact 45.

The motion of connector 6 and mating connector 8 coupled by way of link guide 14 creates a relative motion between blade-shaped contacts 26 and associated fork-shaped contacts 40. In the context of the plugging process between connector 6 and mating connector 8, a shift of the respective at least one point of contact 45 on contact surfaces 24a of blade-shaped contacts 26 consequently occurs. Due to course 102 of link track 100, the respective at least one point of contact 45 can shift at least in sections parallel to course 102 of link track 100, i.e., along direction 104. FIG. 10 shows a shift of the respective at least one point of contact 45, wherein the course 47 of the shift is shown by a dashed arrow. In the case of a curved link track 100, the course 47 exhibits a corresponding curvature. Alternatively or in addition, the respective at least one point of contact 45 can also be shifted in sections parallel to first plug-in direction 10 and/or second plug-in direction 12.

This ensures that the connector 6 can be plugged to the mating connector 8, even if either the connector 6 or the mating connector 8 is not directly accessible. In addition, the unplugging process can also be carried out by the coupled motion when the connector 6 or the mating connector 8 is accessible only from one side.

Figure 9:
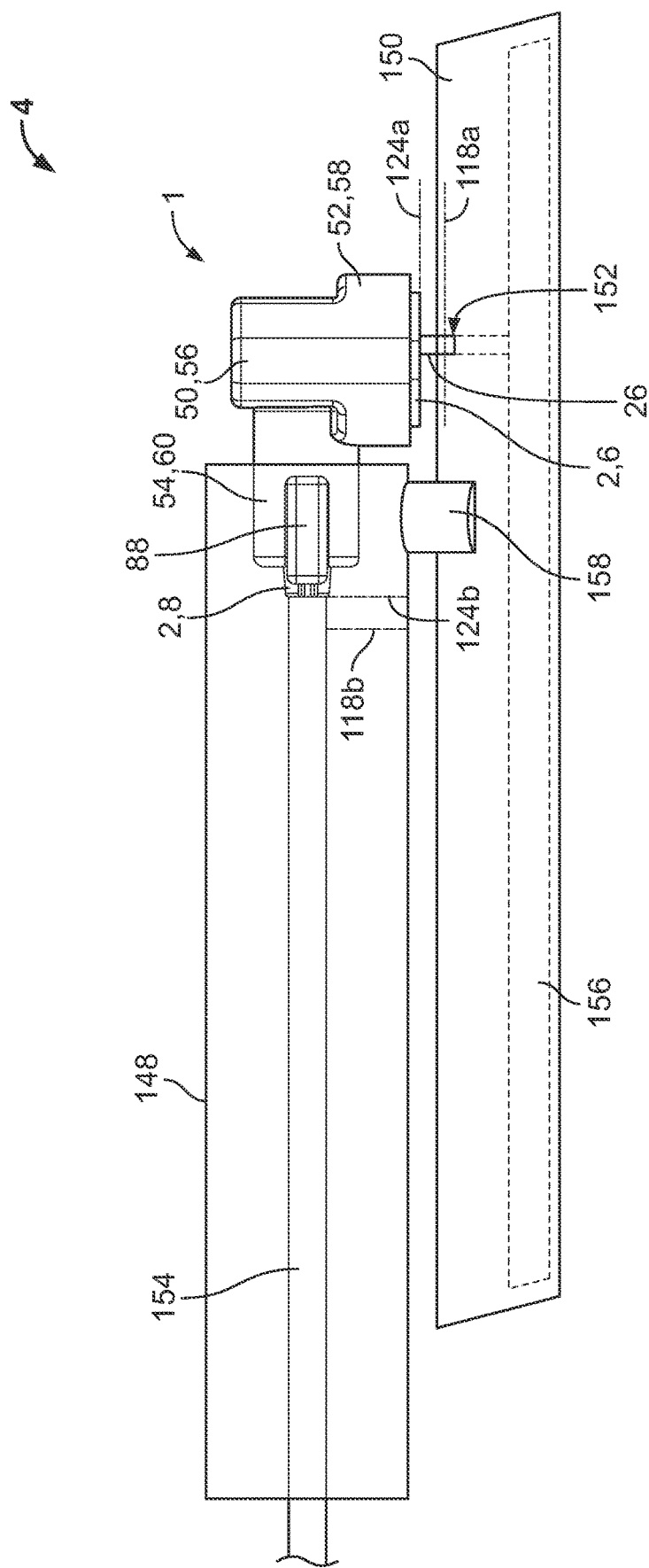
FIG. 9 is a schematic side view of a windshield wiper according to an embodiment.

As shown by way of example in FIG. 9, mating connector 8 can be installed in a wiper arm 148 of windshield wiper 4 such that it is inaccessible from the outside and still can be moved with the aid of link guide 14 from pre-assembly position 118*b* of mating connector 8 to final assembly position 124*b* of mating connector 8, in that connector 6 is moved from pre-assembly position 118*a* of connector 6 to final assembly position 124*a* of connector 6. Connector 6 can be there attached to a wiper blade 150.

As shown in FIG. 9, ends 152 of fork-shaped contacts 40 facing away from contact surfaces 24*b* of fork-shaped contacts 40 can each be crimped onto conductors of an electrical cable 154 of wiper arm 148. Ends 152 of blade-shaped contacts 26 facing away from contact surfaces 24*a* of blade-shaped contacts 26 can in turn be connected to electric heating elements 156 of wiper blade 150 by way of soldering, welding or similar fastening methods.

Overall, wiper blade 150 can be releasably connected to wiper arm 148 by way of angled plug connection 1 according to the invention. If required, at least one further mechanical and/or fluid-delivering connection element 158 can connect wiper blade 150 to wiper arm 148.

To ensure the tightness of angled plug connection 1 against the ingress of water or other liquids, connector housing 16*b* of mating connector 8 can be surrounded by a sealing ring 162 in a circumferential direction 160 perpendicular to second plug-in direction 12, as shown in FIG. 1. Sealing ring 162 can then serve to seal gap 164*b* between connector housing 16*b* of mating connector 8 and guide housing 50. Guide housing 50 can alternatively be equipped with such a sealing ring 162. This is shown in FIG. 2 for sealing gap 164*a* between connector housing 16*a* of connector 6 and guide housing 50.

The present invention enables the implementation of two different plug-in directions 10, 12 which can be adapted to the respectively available space and direction requirements of the application. This contributes to enhanced applicability of the angled plug connection 1. Furthermore, a plugging process between the connector 6 and the mating connector 8 can be supported by the link guide 14, so that the angled plug connection 1 can be handled better and more easily.

What is claimed is:

1. An angled plug connection, comprising:
   a connector adapted to be plugged along a first plug-in direction; and
   a mating connector adapted to be plugged along a second plug-in direction extending at an angle or perpendicularly to the first plug-in direction, the connector is connected to the mating connector by a link guide, a motion of the connector along the first plug-in direction is coupled by the link guide to a motion of the mating connector along the second plug-in direction, the connector has a link guide element fixed to a connector housing of the connector and the mating connector has a link guide element fixed to a connector housing of the mating connector, the connector housing of the connector holds a blade-shaped contact of the connector and the connector housing of the connector has a fixed position with respect to the blade-shaped contact during the motion of the connector along the first plug-in direction into a final assembly position with the mating connector, the connector housing of the mating connector holds a fork-shaped contact of the mating connector and the connector housing of the mating connector has a fixed position with respect to the fork-shaped contact during motion of the mating connector along the second plug-in direction into the final assembly position with the connector, the link guide is formed by the link guide element of the mating connector that is complementary to the link guide element of the connector.

2. The angled plug connection of claim 1, wherein the link guide element of the connector has a sliding block and the link guide element of the mating connector has a connecting link.

3. The angled plug connection of claim 2, wherein the connecting link has a link track shaped to be complementary to the sliding block.

4. The angled plug connection of claim 1, further comprising a guide housing having a first receptacle receiving the connector and a second receptacle receiving the mating connector.

5. The angled plug connection of claim 4, wherein the first receptacle extends along the first plug-in direction and the second receptacle extends along the second plug-in direction.

6. The angled plug connection of claim 5, wherein the second receptacle opens into the first receptacle.

7. The angled plug connection of claim 1, wherein the mating connector has a contact slot associated with a blade-shaped contact of the connector.

8. The angled plug connection of claim 7, wherein the blade-shaped contact is received in the contact slot in a movable manner relative to the contact slot in a direction along the link guide while in contact with the contact slot.

9. The angled plug connection of claim 2, wherein the sliding block is a rail-like projection extending at an angle to the first plug-in direction.

10. The angled plug connection of claim 9, wherein the rail-like projection extends from an inner surface of the connector housing of the connector into an interior of the connector housing of the connector toward the blade-shaped contact.

11. The angled plug connection of claim 4, wherein the guide housing has a linear guide element and at least one of the connector and the mating connector has a complementary linear guide element that is received in the linear guide element during movement of the connector along the first plug-in direction or during movement of the mating connector along the second plug-in direction.

12. The angled plug connector of claim 11, wherein the complementary linear guide element of the connector is a channel-like concavity extending along the first plug-in direction into an outer surface of the connector housing of the connector.

13. The angled plug connector of claim 11, wherein the complementary linear guide element of the mating connector is a rail-like convexity extending along the second plug-in direction and protruding from an outer surface of the connector housing of the mating connector.

14. A windshield wiper, comprising:
   a wiper arm; and
   a wiper blade connected to the wiper arm by an angled plug connection, the angled plug connection including a connector adapted to be plugged along a first plug-in direction and a mating connector adapted to be plugged along a second plug-in direction extending at an angle or perpendicularly to the first plug-in direction, the connector is connected to the mating connector by a link guide, a motion of the connector along the first plug-in direction is coupled by the link guide to a motion of the mating connector along the second plug-in direction, the connector has a link guide element fixed to a connector housing of the connector and the mating connector has a link guide element fixed to a connector housing of the mating connector, the connector housing of the connector holds a blade-shaped contact of the connector and the connector housing of the connector has a fixed position with respect to the blade-shaped contact during the motion of the connector along the first plug-in direction into a final assembly position with the mating connector, the connector housing of the mating connector holds a fork-shaped contact of the mating connector and the connector housing of the mating connector has a fixed position with respect to the fork-shaped contact during motion of the mating connector along the second plug-in direction into the final assembly position with the connector, the link guide is formed by the link guide element of the mating connector that is complementary to the link guide element of the connector.

\* \* \* \* \*